(12) United States Patent
Sakurazawa

(10) Patent No.: US 7,207,264 B2
(45) Date of Patent: Apr. 24, 2007

(54) METHOD AND DEVICE FOR MANUFACTURING WAVED NOODLE

(75) Inventor: Hatsuo Sakurazawa, Takasaki (JP)

(73) Assignee: Fuji Manufacturing Corporation Ltd. (JP)

( * ) Notice: Subject to any disclaimer, the term of this patent is extended or adjusted under 35 U.S.C. 154(b) by 474 days.

(21) Appl. No.: 10/312,930

(22) PCT Filed: Jun. 19, 2001

(86) PCT No.: PCT/JP01/05229

§ 371 (c)(1),
(2), (4) Date: Dec. 30, 2002

(87) PCT Pub. No.: WO02/11560

PCT Pub. Date: Feb. 14, 2002

(65) Prior Publication Data

US 2003/0101876 A1    Jun. 5, 2003

(30) Foreign Application Priority Data

Aug. 3, 2000    (JP)    ............................. 2000-235077

(51) Int. Cl.
*A21C 11/24*    (2006.01)

(52) U.S. Cl. ........................... 99/467; 99/483; 99/537; 425/301; 425/307

(58) Field of Classification Search ................ 426/443, 426/496, 502, 503, 517, 518; 425/289, 301, 425/306–307; 99/467, 482, 537
See application file for complete search history.

(56) References Cited

U.S. PATENT DOCUMENTS 3,368,503 A * 2/1968 Gaylord ..................... 426/19
3,494,302 A * 2/1970 Wolf et al. ................. 426/275
5,042,369 A * 8/1991 Tomoda ...................... 99/353

(Continued)

FOREIGN PATENT DOCUMENTS

JP        57-188502 A        11/1982

(Continued)

OTHER PUBLICATIONS

International Search Report dated Jul. 24,2001.

(Continued)

*Primary Examiner*—Drew Becker
(74) *Attorney, Agent, or Firm*—Young Basile

(57) ABSTRACT

To provide a method of manufacturing waved noodles, which saves labor of controlling weight of noodle lines at the time of cutting the noodle lines and restrains apparatus cost. A continuous noodle strip 26 with predetermined thickness formed by a noodle machine 2 is cut into a noodle strip 28 with a length for one meal by a cutter 20. The noodle strip for one meal is slit into the noodle lines by a slitter 22. Then, a waving box continuously arranged at a lower portion of the slitter waves the noodle lines for one meal. Waved noodle lines 30 for one meal are conveyed one by one by a conveyer 32 and dropped from the front end of the conveyer toward a shooter 34. The noodle lines 30 dropped from the front end of the conveyer toward the shooter 34 hang downwardly at their front parts 30a to extend their waves and to loosen their sticking parts and fall pulling their rear parts 30b.

6 Claims, 3 Drawing Sheets

U.S. PATENT DOCUMENTS 5,167,980 A * 12/1992 Herod et al. ................ 426/496
5,738,896 A *  4/1998 Cassetta et al. ............. 426/557
6,269,850 B1 * 8/2001 Price et al. ................. 141/238

FOREIGN PATENT DOCUMENTS

| JP | 63-48491 U | 4/1988 |
| JP | 7-5385 U | 1/1995 |
| JP | 1995-05386 | 1/1995 |

OTHER PUBLICATIONS

Notification of the first Office Action (PCT Application in the National Phase).

Manufacturing technology of new style hot-dried noodles, J. Wu and S. S. Tan, Oinhuangdao Bontai Food Factory From Food Science (1997 vol. 18 No. 11, p. 63-64).

* cited by examiner

METHOD AND DEVICE FOR MANUFACTURING WAVED NOODLE

BACKGROUND OF THE INVENTION

1. Field of the Invention

The present invention relates to a method and a device for manufacturing waved noodles.

2. Description of the Related Art

A manufacturing method of a process flow shown in FIG. 3 is known as manufacturing instant noodles with wave (crimped).

In the manufacturing method in FIG. 3, first, raw materials such as flour, buckwheat flour and starch are fed in a kneading machine such as a mixer, and prepared water for kneading is added. After kneading for predetermined time, dough is taken out of the kneading machine and passed through a noodle machine 2 to be formed into a continuous noodle strip with predetermined thickness. The noodle strip is passed through a slitter 4 to be slit into numbers of long noodle lines. The noodle lines are then passed through a waving box 6 to be waved. The waved noodle lines are fed to a starching machine 8 and subjected to a steaming step so that the starch turns to a-starch (steaming step). After the steaming treatment is finished, the noodle lines are passed through a loosening machine 10 where liquid is sprayed on the noodle lines to loosen their sticking parts. Then, the long noodle lines as conveyed are cut into a length for one meal by a cutter 12. The noodle lines for one meal are passed through a drier 14 to fix the a-starch condition.

In the above described method of manufacturing instant noodles, waved noodle lines are cut into a length for one meal by a cutter 12, so that weight of the noodle lines for one meal is liable to variation, which results in requiring many workers for controlling the weight of the cut noodle lines. In this way, the above described method has problems in saving labor since it comprises a step of cutting the waved noodle lines.

Further, the above described method also has a problem in apparatus cost since it requires numbers of machines so that a manufacturing line comes to be enlarged.

The present invention is achieved in view of the above described conventional problems and has its object to provide a method and a device for manufacturing waved noodles which can save labor such as controlling weight at the time of cutting the noodle lines as well as restrain the apparatus cost.

SUMMARY OF THE INVENTION

The method of manufacturing waved noodles according to the present invention comprises: a first step of forming dough into a continuous noodle strip with predetermined thickness by a noodle machine; a second step of cutting the noodle strip fed from the first step into a length for one meal by a cutter; a third step of slitting the noodle strip for one meal fed from the second step into noodle lines by a slitter; a fourth step of waving the noodle lines fed from the third step by a waving device; and a fifth step of feeding the waved noodle lines fed from the fourth step to a starching machine so that starch turns to a-starch.

Further, the waved noodle lines fed from the fourth step hang downwardly at their front parts to extend their waves, and the noodle lines for one meal are loosened at their sticking parts to be fed to the starching machine of the fifth step.

The method of manufacturing waved noodles according to the present invention also comprises: a first step of forming dough into a continuous noodle strip with predetermined thickness by a noodle machine; a second step of cutting the noodle strip fed from the first step into a length for one meal by a cutter; and a third step of slitting the noodle strip for one meal fed from the second step into noodle lines by a slitter.

The method of manufacturing waved noodles according to the present invention also comprises: a first step of forming dough into a continuous noodle strip with predetermined thickness by a noodle machine; a second step of cutting the noodle strip fed from the first step into a length for one meal by a cutter; and a third step of slitting the noodle strip for one meal fed from the second step into noodle lines and waving this noodle lines by a waving device.

The device of manufacturing waved noodles according to the present invention also comprises; a noodle strip forming means for forming dough into a continuous noodle strip with predetermined thickness by a noodle machine; a noodle strip cutting means for cutting the noodle strip fed from the noodle strip forming means into a length for one meal; a noodle lines forming means for slitting the noodle strip for one meal fed from the noodle strip forming means into noodle lines; a waving means for waving the noodle lines fed from the noodle lines forming means; and a starching means, wherein the waved noodle lines hang downwardly at their front parts to extend their waves, and the starch of the waved noodle lines, loosened at their sticking parts and fed from the waving means, is turned to a-starch.

DETAILED DESCRIPTION OF THE PREFERRED EMBODIMENTS

An embodiment of a method of manufacturing instant noodles according to the present invention will be described with reference to the drawings.

Figure 1:
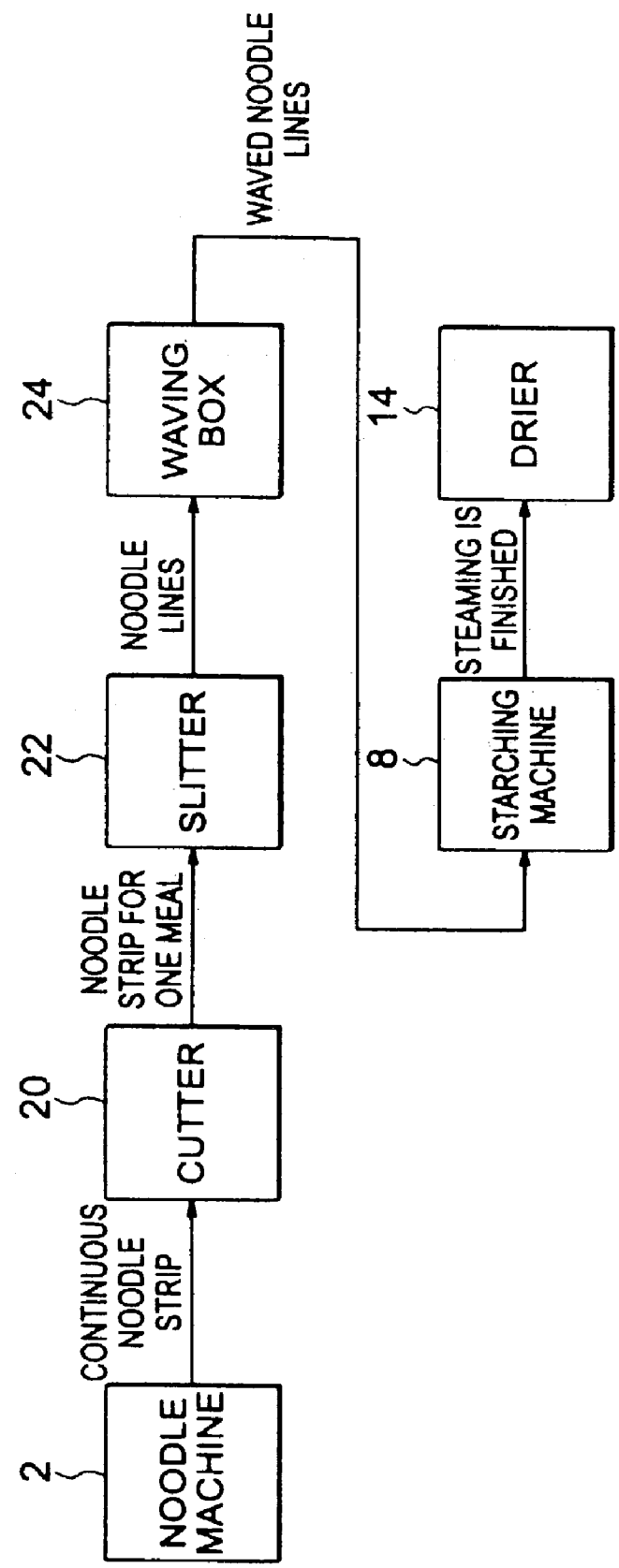
FIG. 1 is a block diagram showing a process flow of a method of manufacturing instant noodles according to the present invention.
Figure 3:
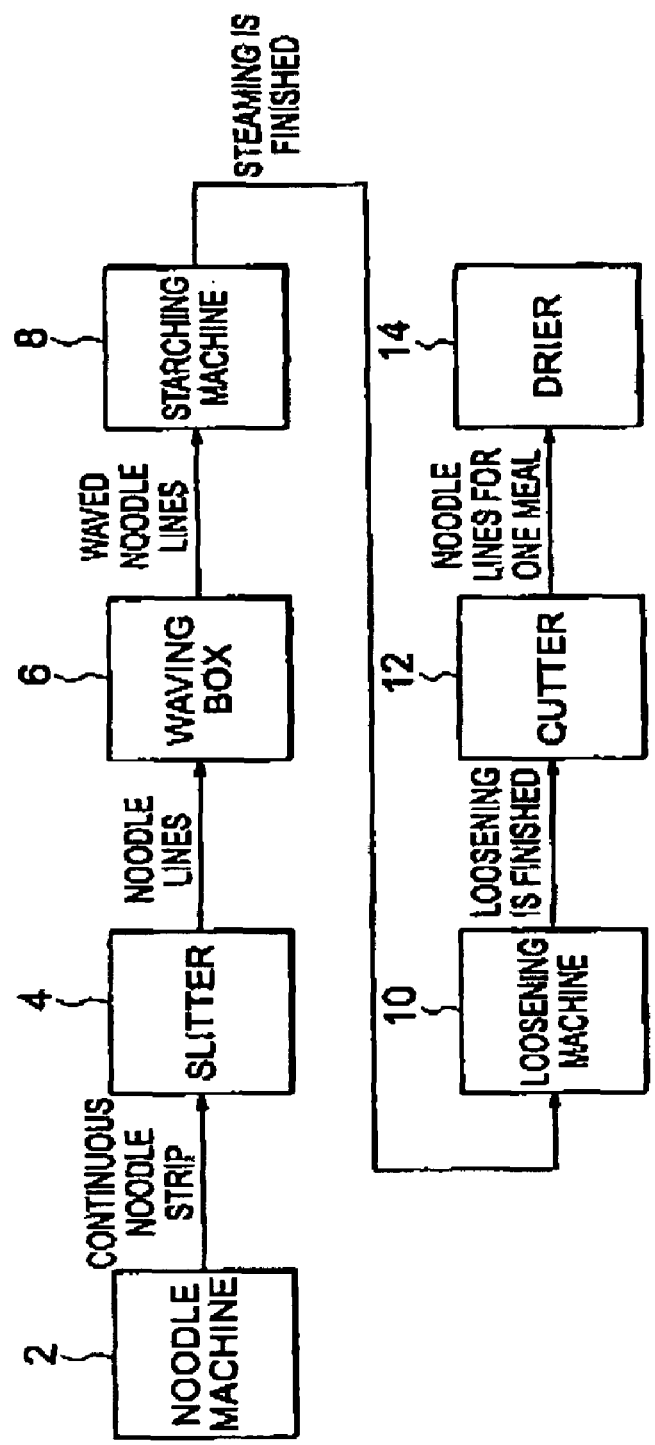
FIG. 3 is a block diagram showing a process flow of a conventional method of manufacturing instant noodles.

FIG. 1 shows a process flow of a method of manufacturing instant noodles according to this embodiment, in which the same components as in a conventional method shown in FIG. 3 are referred to by the same reference numerals and their descriptions will be omitted.

In this embodiment, dough is passed through a noodle machine 2 to be formed into a continuous noodle strip with predetermined thickness. The noodle strip is cut into a length for one meal by a cutter 20. The noodle strip for one meal is slit into noodle lines by a slitter 22. The noodle lines for one meal are then waved by a waving box (a waving device) 24. Then, the waved noodle lines are fed to a starching machine 8 so that starch turns to a-starch (steaming step). After the steaming step is finished, the noodle lines are passed through a drier 14 to substantially complete and fix the a-starch condition.

According to the above described method of manufacturing instant noodles, the continuous noodle strip with predetermined thickness is cut into a length for one meal by a cutter 20, the noodle strip for one meal is slit into the noodle lines by the slitter 22, and then the noodle lines for one meal are waved by a waving box 24. This reduces variation in weight of the noodle lines for one meal and eliminates most of the needs for an operation of controlling the weight of the noodle lines.

The cutter 20 cuts the continuous noodle strip, so that no chips are generated as happens when cutting the waved noodle lines. This eliminates the needs also for an operation of removing the chips.

Accordingly, adopting the manufacturing method according to this embodiment, comprising the steps of: cutting the noodle strip into a length for one meal by the cutter 20; slitting the noodle strip for one meal into the noodle lines by the slitter 22; and waving the noodle lines, permits saving labor.

Figure 2:
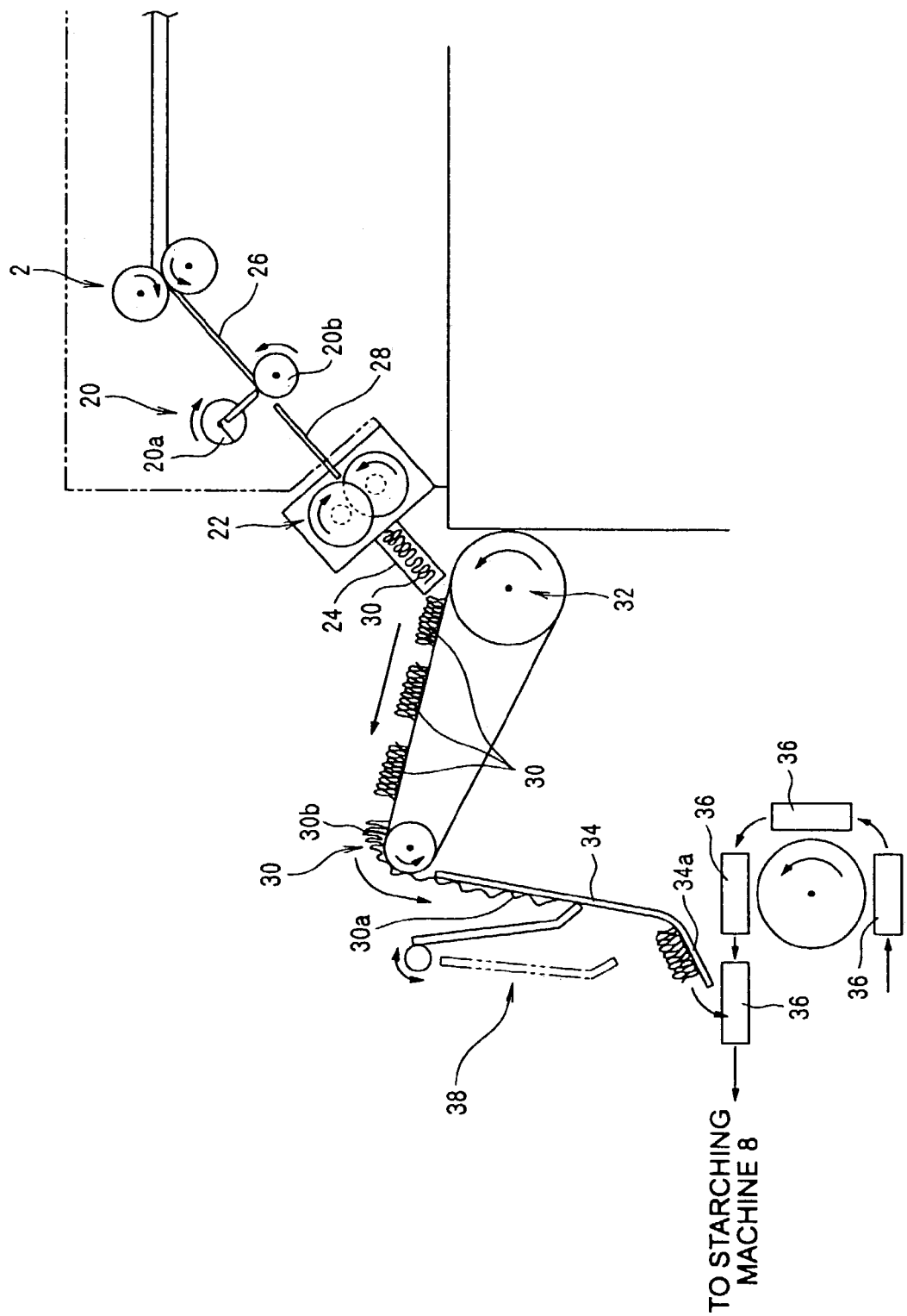
FIG. 2 is a view showing in detail a machine used in the method of manufacturing instant noodles according to the present invention.

Next, FIG. 2 shows in detail configurations of devices used in the above described method of manufacturing instant noodles, such as the noodle machine 2, the cutter 20, the slitter 22 and the waving box 24.

A continuous noodle strip 26 with predetermined thickness formed by the noodle machine 2 is cut into a noodle strip 28 with a length for one meal by the cutter 20 consisting of a cutting blade roll 20a and a receiving blade roll 20b. The noodle strip 28 for one meal is slit into the noodle lines by the slitter 22 which is a roll-shape rotary slitting device.

A waving box 24 continuously arranged at a lower portion of the slitter 22 waves the noodle lines for one meal.

Waved noodle lines 30 for one meal are conveyed one by one by a conveyer 32 and dropped from the front end of the conveyer 32 toward a shooter 34.

The shooter 34 is provided with a shutter 38 which opens when a basket 36 moving toward a starching machine (not shown in FIG. 2) 8 is below a shooter outlet 34a. By the operation of the shutter 38, the noodle lines 30 for one meal are accommodated in each basket 36. And as shown in FIG. 1, the starch of the noodle lines 30 accommodated in the basket 36 is turned to a-starch by the starching machine 8 and the a-starch condition is substantially completed and fixed by the drier 14.

When the noodle lines 30 are dropped from the front end of the conveyer 32 toward the shooter 34, they hang downwardly at their front parts 30a to extend their waves and to loosen their sticking parts and fall pulling their rear parts 30b.

In this way, the waved noodle lines hang downwardly at their front parts 30a on the way to the starching machine 8 to extend their waves and to loosen their sticking parts automatically, thereby eliminating the needs for a conventionally used loosening machine.

Accordingly, in this embodiment, the loosening machine used in a conventional manufacturing method comes to be unnecessary, thereby permitting shortening of the manufacturing line and reduction in apparatus cost.

In the above described embodiment, the noodle lines are fed to the starching machine 8 by the basket 36. But the feeding means is not limited to the basket, and the noodle lines can be fed to the starching machine 8 by, for example, an endless net conveyor. This can be performed by arranging a cutter 12 before the starching machine 8. Accordingly, the present invention can be used with the starching machine wherein the noodle lines are fed by a basket or a net conveyor, thereby permitting the larger range of the choices of the starching machine.

INDUSTRIAL APPLICABILITY

The method of manufacturing waved noodles comprises: a second step of cutting the noodle strip into a length for one meal by a cutter; a third step of slitting the noodle strip for one meal into the noodle lines by a slitter; and a fourth step of waving the noodle lines. This reduces variation in the weight of the noodle lines for one meal and eliminates most of the need for an operation of controlling the weight of the noodle lines, thereby permitting saving labor.

Further, according to the method of manufacturing waved noodles, the waved noodle lines hang downwardly at their front parts to extend their waves and to loosen their sticking parts automatically on the way to the starching machine, the boiling machine or the drier, thereby eliminating the needs for the conventionally used loosening machine and permitting shortening of the manufacturing line and reduction in apparatus cost.

What is claimed is:

1. A device of manufacturing waved noodles, comprising;
   a noodle machine for forming dough into a continuous noodle strip with predetermined thickness;
   a cutter, which consists of cutting blade roll and a receiving blade roll, for cutting the continuous noodle strip fed from the noodle machine into a noodle strip with a length for a single meal;
   a slitter, which is a roll-shape rotary slitting device, for slitting the noodle strip for the single meal fed from the cutter into noodle lines;
   a waving box contiguously arranged at a lower portion of the slitter for waving the noodle lines for the single meal fed from the slitter;
   a conveyor for conveying waved noodle lines for the single meal fed from the waving box and for dropping the waved noodle lines for the single meal from the front end thereof a shooter which receives the waved noodle lines from the conveyor wherein the waved noodle lines for the single meal are dropped from the front end of the shooter, the noodle lines for the single meal hang downwardly at their front parts from the shooter to extend the waves, to loosen their sticking parts and to fall pulling their rear parts;
   baskets each for accommodating the waved noodle lines for one single meal dropped from the shooter and for feeding the waved noodle lines for the single meal to a starching machine; and
   the starching machine for turning the starch of the waved noodle lines for the single meal accommodated in the basket to a-starch by a steaming step.

2. The device of manufacturing waved noodles according to claim 1, wherein the shooter is provided with a shutter which opens when the basket moving toward the starching machine is below a shooter outlet, and the waved noodle lines for the single meal are accommodated in each basket by the operation of the shutter.

3. A device of manufacturing waved noodles, comprising:
   a noodle machine for forming dough into a continuous noodle strip with a predetermined thickness;
   a cutter which consists of a cutting blade roll and a receiving blade roll, for cutting the continuous noodle strip fed from the noodle machine into a noodle strip with a length for one meal;
   a slitter, which is a roll-shape rotary slitting device, for slitting the noodle strip for one meal fed from the cutter into noodle lines;

a waving box contiguously arranged at a lower portion of the slitter for waving the noodle lines for one meal fed from the slitter.

a conveyer for conveying waved noodle lines for one meal fed from the waving box and for dropping the waved noodle lines for one meal from the front end thereof a shooter which receives the waved noodle lines from the conveyor wherein when the waved noodle lines for the single meal hang downwardly at their front parts from the shooter to extend the waves, to loosen their sticking parts and to fall pulling their rear parts;

an endless net conveyor for conveying the waved noodle lines for one meal dropped from the shooter to a starching machine; and the starching machine for turning the starch of the waved noodle lines for one meal fed to a-starch by a steaming step.

4. The device of claim 3, wherein the waving box is downstream of the cutter and slitter for continuously waving the noodle lines for only one meal at a time.

5. A device for manufacturing waved noodles, comprising:

a noodle machine for forming dough into a continuous noodle strip with a predetermined thickness;

a cutter having a cutting blade roll and a receiving blade roll, said cutter set for cutting the continuous noodle strip fed from the noodle machine into a noodle strip with a length for a single portion meal;

a roll-shape rotary slitting device, positioned downstream of the cutter, for slitting the noodle strip of the single meal portion into noodle lines;

a waving box, positioned downstream of the slitting device, for waving each of the single meal portions of the noodle lines individually and continuously;

a conveyor, positioned downstream of the waving box, for conveying the waved single meal portions of the noodle lines away from the waving box, said conveyor having a first end wherein the single meal portion of the noodle lines drop at the front of the conveyor to a shooter by gravity for extending the waves and loosening sticky parts in the single meal portion of the noodle lines, said shooter having a shutter for regulating the fall of the single meal portion of the noodle lines to a feeding means to a starching machine.

6. The device of claim 5, wherein the feeding means is a basket, and a series of baskets are provided so that each basket receives a single meal portion of the noodle lines and wherein the shutter opens when one of the baskets is below the shooter for receiving the single meal portion of the noodle lines.

* * * * *

UNITED STATES PATENT AND TRADEMARK OFFICE
CERTIFICATE OF CORRECTION

PATENT NO. : 7,207,264 B2  Page 1 of 1
APPLICATION NO. : 10/312930
DATED : April 24, 2007
INVENTOR(S) : Hatsuo Sakurazawa It is certified that error appears in the above-identified patent and that said Letters Patent is hereby corrected as shown below:

| | |
|---|---|
| Title page, Item (54) (Title): | Replace "NOODLE" with --NOODLES--. |
| Column 1, Line 2 (Title): | Replace "NOODLE" with --NOODLES--. |
| Column 1, Line 24: | Replace "a-starch" with --α-starch--. |
| Column 1, Line 30: | Replace "a starch" with --α-starch--. |
| Column 1, Line 62: | Replace "a-starch" with --α-starch--. |
| Column 2, Line 31: | Replace "a-starch" with --α-starch--. |
| Column 2, Line 62: | Replace "a-starch" with --α-starch--. |
| Column 2, Line 65: | Replace "a-starch" with --α-starch--. |
| Column 3, Line 40: | Replace "a-starch" with --α-starch--. |
| Column 3, Line 41: | Replace "a-starch" with --α-starch--. |
| Column 4, Line 37: | After "thereof" insert --;--. |
| Column 4, Line 51: | Replace "a-starch" with --α-starch--. |
| Column 5, Line 3: | After "slitter" delete "." and insert --;--. |
| Column 5, Line 7: | After "thereof" insert --;--. |
| Column 5, Line 16: | Replace "a-starch" with --α-starch--. |

Signed and Sealed this

Seventh Day of August, 2007

JON W. DUDAS
*Director of the United States Patent and Trademark Office*